(12) United States Patent
Sley

(10) Patent No.: US 6,646,801 B1
(45) Date of Patent: Nov. 11, 2003

(54) GLARE REDUCTION SYSTEM AND METHOD

(76) Inventor: Benjamin Sley, 828 Ridgewood Blvd., Hudson, OH (US) 44236

( * ) Notice: Subject to any disclaimer, the term of this patent is extended or adjusted under 35 U.S.C. 154(b) by 195 days.

(21) Appl. No.: 09/591,586

(22) Filed: Jun. 9, 2000

(51) Int. Cl.[7] .................................................. G02B 5/30
(52) U.S. Cl. ...................... 359/493; 359/240; 359/485; 359/489; 359/494; 359/501; 359/599; 359/601
(58) Field of Search ................................ 359/493, 494, 359/485, 489, 501, 599, 601, 240

(56) References Cited

U.S. PATENT DOCUMENTS

| | | |
|---|---|---|
| 1,733,915 A | 10/1929 | Short |
| 1,734,022 A | 10/1929 | Short |
| 1,873,951 A | 8/1932 | Zocher |
| 1,918,848 A | 7/1933 | Land et al. |
| 2,005,426 A | 6/1935 | Land |
| 2,031,045 A | 2/1936 | Land |
| 2,087,795 A | 7/1937 | Chubb |
| 2,099,694 A | 11/1937 | Land |
| 2,102,632 A | 12/1937 | Land |
| 2,123,901 A | 7/1938 | Land |
| 2,180,114 A | 11/1939 | Land |
| 2,185,000 A | 12/1939 | Land |
| 2,237,565 A | 4/1941 | Land |
| 2,237,566 A | 4/1941 | Land |
| 2,255,933 A | 9/1941 | Land |
| 2,301,126 A | 11/1942 | Kriebel |
| 2,334,446 A | 11/1943 | Serrell |
| 2,475,921 A | 7/1949 | Smith |
| 2,819,459 A | 1/1958 | Dodd |
| 3,026,763 A | 3/1962 | Marks |
| 3,621,231 A | 11/1971 | Craig |
| 3,631,288 A * | 12/1971 | Rogers ........................ 313/112 |
| 3,714,413 A | 1/1973 | Craig |
| 4,286,308 A | 8/1981 | Wolff |
| 4,473,277 A | 9/1984 | Brown |
| 5,252,997 A | 10/1993 | Christenbery |
| 5,447,353 A | 9/1995 | Cheng et al. |
| 5,708,522 A * | 1/1998 | Levy ........................ 359/240 |
| 6,038,024 A | 3/2000 | Berner |
| 6,056,397 A | 5/2000 | Berlad |

FOREIGN PATENT DOCUMENTS

| | | |
|---|---|---|
| GB | 365082 | 1/1932 |
| GB | 365507 | 1/1932 |

OTHER PUBLICATIONS

In re Land, Patent Appeal No. 4240, 109 Federal Reporter, 2d Series, Court of Customs and Patent Appeals, Feb. 5, 1940, pp. 246–250.
In re Lane, Patent Appeal No. 4241, 109 Federal Reporter, 2d Series, Court of Customs and Patent Appeals, Feb. 5, 1940, pp. 251–254.
"A Comparative Survey of Some Possible Systems of Polarized Headlights", *Journal of the Optical Society of America*, vol. 38, No. 10, Oct., 1948, pp. 819–829.
*Polarized Light, Production and Use*, William A. Shurcliff, Harvard University Press, Cambridge, Massachusetts, 1962, pp. v–vi, 15–19, 87–108, 129–133, 175, 188–191 and 196.
International Search Report Dated Jun. 25, 2002 for PCT/US01/40789 filed May 22, 2001.

* cited by examiner

*Primary Examiner*—Audrey Chang
*Assistant Examiner*—Craig Curtis
(74) *Attorney, Agent, or Firm*—Amin & Turocy, LLP

(57) ABSTRACT

A system and method for reducing glare is provided in accordance with the present invention. The system may include a first polarizer transmitter for filtering light from a source, and a second polarizer analyzer for viewing the light received from the first polarizer. The first polarizer provides an unmatched polarization characteristic with the second polarizer to mitigate glare. The first polarizer may include a linear polarizer and the second polarizer may include at least one of a circular polarizer and/or an elliptical polarizer.

14 Claims, 7 Drawing Sheets

GLARE REDUCTION SYSTEM AND METHOD

TECHNICAL FIELD

The present invention relates generally to light polarization systems, and more particularly to an improved system and method for reducing glare from a plurality of light sources via an unmatched polarization system.

BACKGROUND OF THE INVENTION

The disabling effect of headlight glare is a significant highway safety problem. Headlights of oncoming cars may be blindingly bright, for example. This may cause objects of low illumination to practically disappear from the driver's field of visibility and may also create driving fatigue. Furthermore, headlight glare may cause annoyance and discomfort to the driver and occupants of a vehicle at night. Although the bulk of highway travel occurs during daylight hours, most highway fatalities occur at night. Consequently, headlight glare may be a factor in many crashes occurring at night.

With the advent of halogen beams, daytime running lamps and eye-level headlights in vehicles such as vans, minivans, light trucks, and Sports Utility Vehicles ("SUV's"), the problem of headlight glare has gotten worse. These problems may persist as higher intensity headlights come into even greater use. Drivers are not only exposed to headlight glare directly from oncoming traffic, but, also from rearview mirrors. The greater number of vans, minivans, light trucks and SUV's has resulted in headlights that are mounted higher than those of a standard auto, increasing the likelihood of glare directly to the eyes of drivers of today's standard cars- either through the front windshield and/or via the rearview mirror. Moreover, many cars, vans, minivans, light trucks and SUV's may have "fog lights" installed, as well as regular headlights, and many of these lights may be improperly aimed.

Increasingly, headlights may become brighter as a result of changes to the U.S. Federal Motor Vehicle Safety Standard governing headlights (FMVSS 108). Thus, today's headlights are brighter and have a wider beam pattern than older headlights of ten or twenty years ago. Presently, U.S. Federal Motor Carrier Safety Regulations require headlights to be mounted between 22 and 54 inches above the road—a considerable variation. Therefore, with brighter lights, wider beam patterns, and diverse headlight mounting requirements, problems resulting from glare will likely continue to increase.

Headlight glare may also cause fatigue and eye strain for toll takers in toll booths during nighttime hours, and may create problems for people living in homes at the end of a cul-de-sac and/or on a street perpendicular to oncoming traffic, for example. Additionally, joggers, bicyclists and/or pedestrians on the side of a road may be temporarily blinded by an oncoming vehicle's headlights such that they may not be able to see obstacles in or on their path causing them to stumble and to possibly receive bodily injury.

Methods to reduce glare and other light glare by use of optical filters has long been known. For example, these methods may include linearly polarized transmitters placed on or near headlights paired with matching linearly polarized analyzers placed on the windshield and/or visor and/or glasses. Also, circularly polarized transmitters paired with matching circularly polarized analyzers is known. Similarly, elliptically polarized transmitters paired with matching elliptically polarized analyzers is known. Unfortunately, a problem associated with these methods is that while they may reduce headlight glare of oncoming cars, they may also substantially reduce the illumination from the driver's own headlights, thus producing a dangerous loss of dim light vision and/or impairing the driver's visibility of the roadway.

Another problem associated with paired matching polarizers (e.g., linear/linear, circular/circular) is that they may substantially extinguish and/or eliminate too much of an oncoming vehicles' headlight luminosity, making it difficult to see oncoming vehicles. Additionally, another problem is that a driver may not be able to see the illumination beam of an oncoming vehicle not yet visible on the other side of a hill or a curve which may serve as an advance warning of that vehicle's approach.

Optical filter lenses on eyeglasses, such as a yellow tint, are not very effective against headlight glare. Some "night driving" glasses may even add an ultraviolet light filter, which is not particularly relevant at night, since UV light is generally produced by the sun. If the night driving glasses are "blue-blocker" lenses which filter available blue light, they may produce severe color distortion which may be a serious hazard when driving at night.

In view of the above problems associated with convention matched pair polarization systems, a system and method is needed that mitigates an oncoming vehicles' headlight glare, does not interfere with one's ability to clearly see the headlights of the oncoming vehicle and/or the illumination beam of a vehicle on the other side of a hill or a curve and, yet, at the same time does not substantially reduce the illumination from the driver's own headlights.

SUMMARY OF THE INVENTION

The present invention relates to a system and method for reducing glare, yet, mitigating visibility losses associated with conventional polarization systems. In accordance with the present invention, a glare reduction system is provided wherein glare from a plurality light sources is mitigated via an improved polarization system while clarity of vision from the light sources may be increased over conventional systems. For example, the present invention enables a driver to clearly see headlights of oncoming vehicles while mitigating the effects of the oncoming vehicle's headlight glare. This may benefit a driver and/or occupant in a second vehicle, a jogger, worker and/or pedestrian on the side of the road, and/or a person in a stationary location such as a toll booth or home. Furthermore, the present invention may be applied to substantially any light source to reduce glare and improve visible clarity. For example, glare from stadium illumination floodlights may be mitigated as viewed by persons in attendance while not substantially reducing the illumination reflected back from stadium field of play. Also, glare from sources such as ambient light on a computer monitor, television, VCR and/or DVD screen may be mitigated while not substantially reducing the illumination coming from the screen.

More specifically, the present invention provides an unmatched (e.g., circular/linear, elliptical/linear) polarization system to achieve glare reduction and improve visibility losses associated with conventional polarization systems. For example, the present invention may provide a linear polarization analyzer associated with a viewer in combination with a circular polarization transmitter associated with a light source. When viewed from the analyzer, glare from the light source may be mitigated without substantial dimming of the source. In contrast to conventional matched polarization systems wherein a pair of linearly matched systems, circularly matched system, and/or elliptically matched systems may be employed, the present invention does not substantially sacrifice light intensity for the sake of reducing associated glare. Thus, a substantial improvement may be achieved over conventional systems. Additionally, the present invention may provide the above benefits at lower costs than associated with systems consisting of two matched circular polarizers and/or two matched elliptical polarizers.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
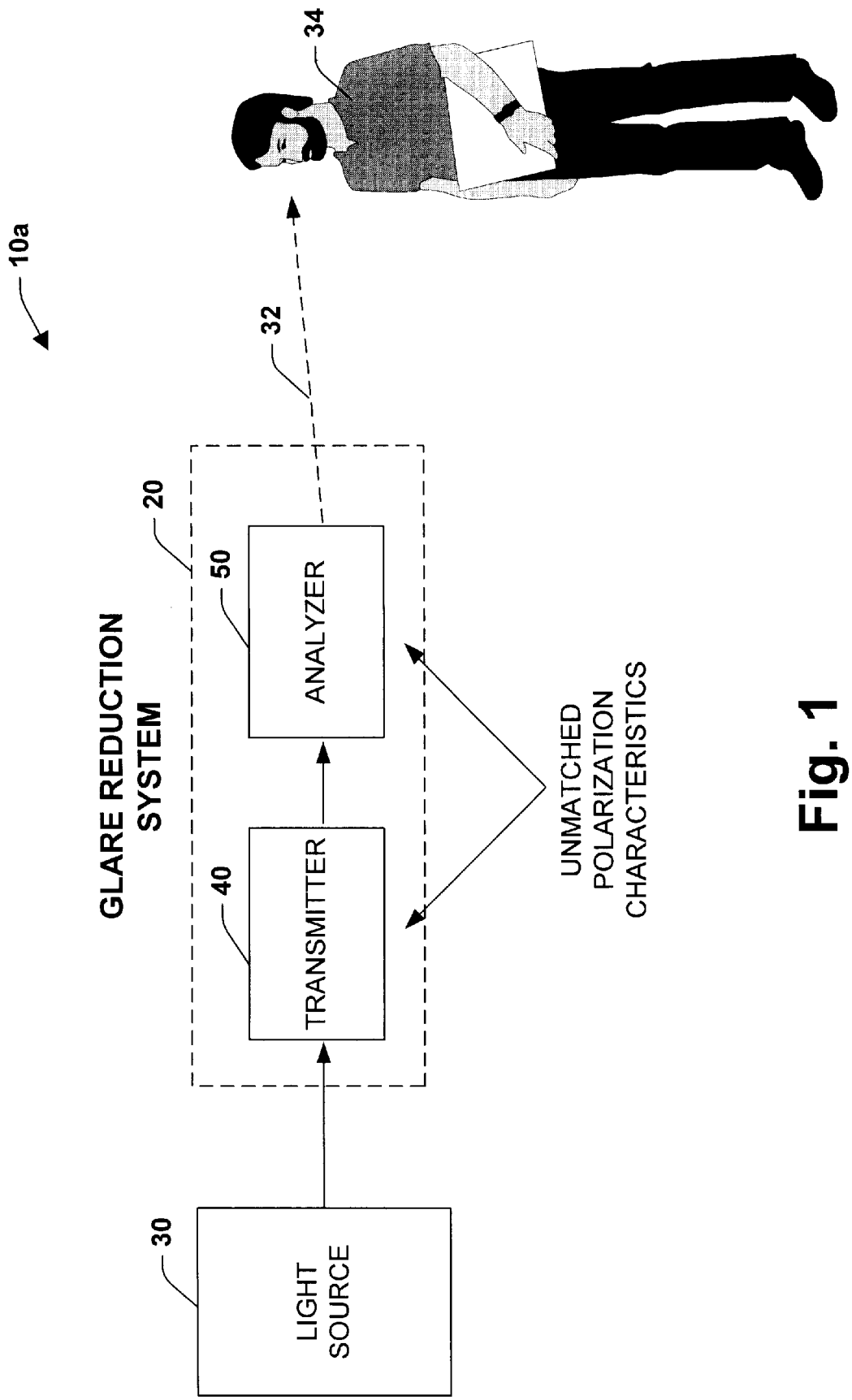
FIG. 1 is a schematic block diagram illustrating a glare reduction system in accordance with one aspect of the present invention.

The present invention is now described with reference to the drawings, wherein like reference numerals are used to refer to like elements throughout.

In accordance with the present invention, a system and method is provided for reducing glare. As will be described in more detail below, an unmatched polarization system is provided wherein linear plane polarizers may be applied in combination with circular/elliptical polarizers to facilitate glare reduction from a light source and to improve visibility over conventional polarization systems.

Referring initially to FIG. 1, a system 10a illustrates a particular aspect of the present invention relating to glare reduction. A glare reduction system 20 facilitates reducing glare from a light source 30 by providing filtered light 32 to an observer 34. The glare reduction system 20 may include a transmitter 40 and an analyzer 50. The transmitter 40 may be generally located near the light source 30 and provide a first order of light filtration from the light source 30. The analyzer 50 may be generally located near the observer 34 in order that desired light sources may be filtered for a second time to reduce glare. For example, the light sources 30 may include headlights, stadium lights, airport runway lights and/or display screens. As will be described in more detail below, the analyzer 50 may be applied to a plurality of shapes and forms, for example—glasses, goggles, visors, windshields, etc. It is to be appreciated that the transmitter 40 and analyzer 50 may also be provided in close proximity to one another in the path of the observer 34 wherein substantially all light 32 approaching the observer 34 is filtered by both the transmitter 40 and analyzer 50. As illustrated in FIG. 1, the glare reduction system 20 provides unmatched polarization characteristics between the transmitter 40 and the analyzer 50. For example, the transmitter 40 may be a linear plane polarizer wherein the analyzer 50 may be a circular and/or elliptical polarizer. The reverse combination may also apply wherein the transmitter 40 may provide circular/elliptical polarization and the analyzer 50 provides linear polarization. In contrast to conventional matched polarization systems whereby the transmitter/analyzer characteristics are matched (e.g., linear transmitter/linear analyzer, circular transmitter/circular analyzer), it has been discovered that glare may be suitably reduced by the unmatched system while providing improved visibility over conventional matched systems. This advantageously enables the observer 34 to filter annoying glare from bright light sources 30 without dimming the light to possible undesirable low levels as associated with conventional systems.

Figure 2:
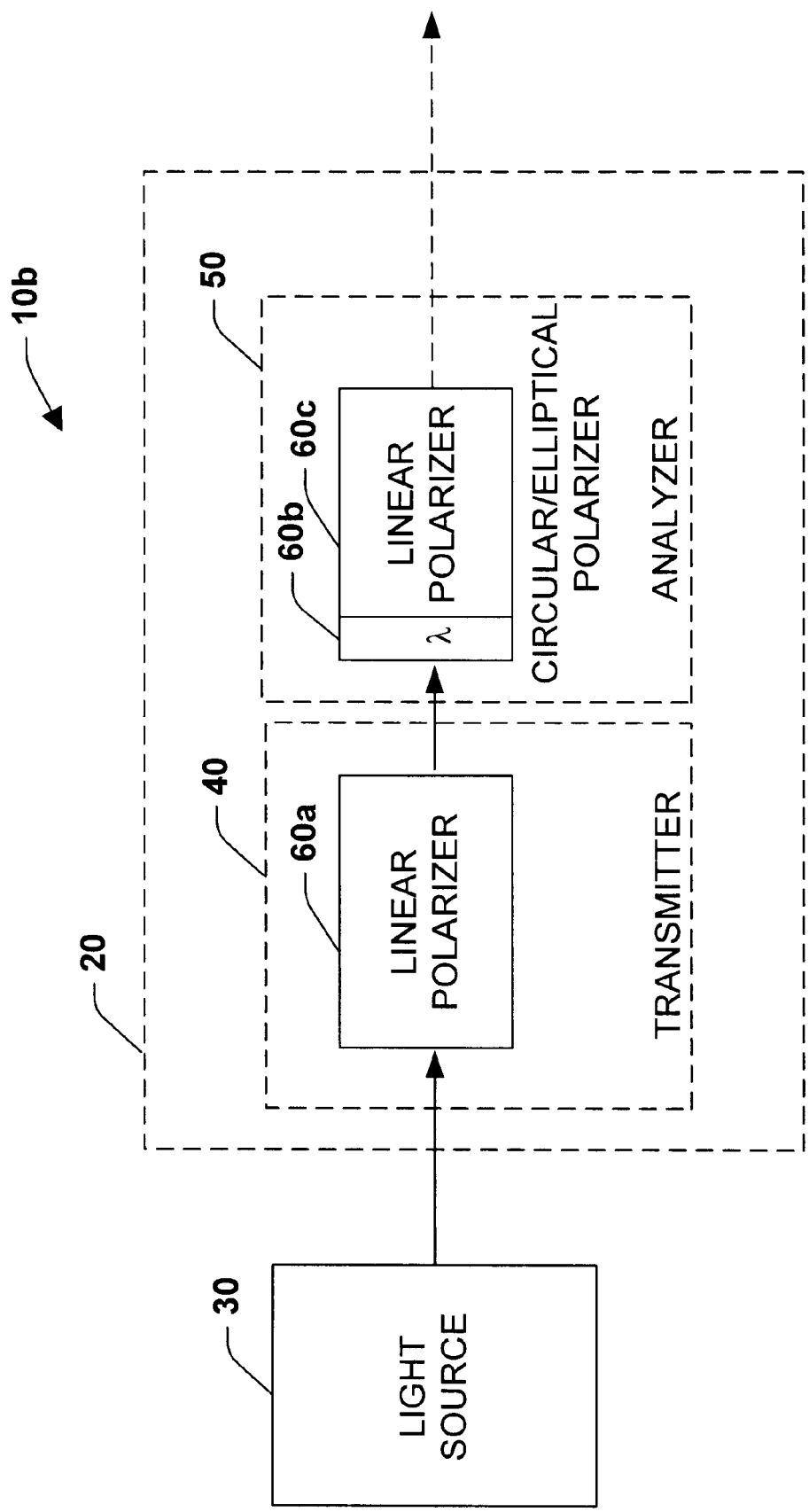
FIG. 2 is a schematic block diagram illustrating an unmatched polarization system in accordance with one aspect of the present invention.

Now referring to FIG. 2, a system 10b illustrates a particular aspect of the glare reduction system 20 depicted in FIG. 1. According to this aspect of the present invention, the transmitter 40 may include a linear polarizer 60a and the analyzer 50 may include a circular/elliptical polarizer including a wave retarder 60b with an associated linear polarizer 60c. The wave retarder may be made of any suitable birefringent material, for example. Linear polarization is well understood in the art and provides a first order of filtration from the light source 30. As described above, the transmitter 40 may be suitably placed in front of the light source 30 such as in front of headlights; fog lights, and/or screens. The analyzer 50 which may be included with goggles, visors, windshields, etc. cooperates with the transmitter 40 to facilitate reducing glare in accordance with the present invention.

As illustrated, the analyzer 50 may include the linear polarizer 60c with the wave retarder 60b. By including the wave retarder 60b with the linear polarizer 60c, circular/elliptical polarization may be achieved as is well understood in the art. According to one aspect of the present invention a 1/4 wave retarder 60b may be employed with a retardation value of about 140+/−20 nm. It is to be appreciated that other suitable wave retarders 60b may be employed. For example, a plurality of values having the characteristic wavelength of n/4 may be employed as wave retarders 60b wherein n is an integer being 0,1,2,3 . . . By employing a linear polarizer 60a with the circular/elliptical polarizer—(60b,60c), the present invention facilitates glare reduction and improves visibility of received filtered light over conventional systems that employ linear/linear and/or circular/circular and/or elliptical/elliptical and/or circular/elliptical combinations. The transmitter and analyzer may each be rotated in a vertical plane essentially parallel to each other such that satisfactory and/or maximum reduction of glare may be achieved. For example, when viewed from the position of observer 34, both the linear polarizer of the transmitter and the linear polarizer component of the analyzer may be rotated 45 degrees from the vertical with respect to their axis of polarization and the wave retarder may be in the vertical position with respect to its axis. A plurality of combinations of rotation of the linear polarizers and wave retarder with respect to each other may be employed to achieve suitable results.

Figure 3:
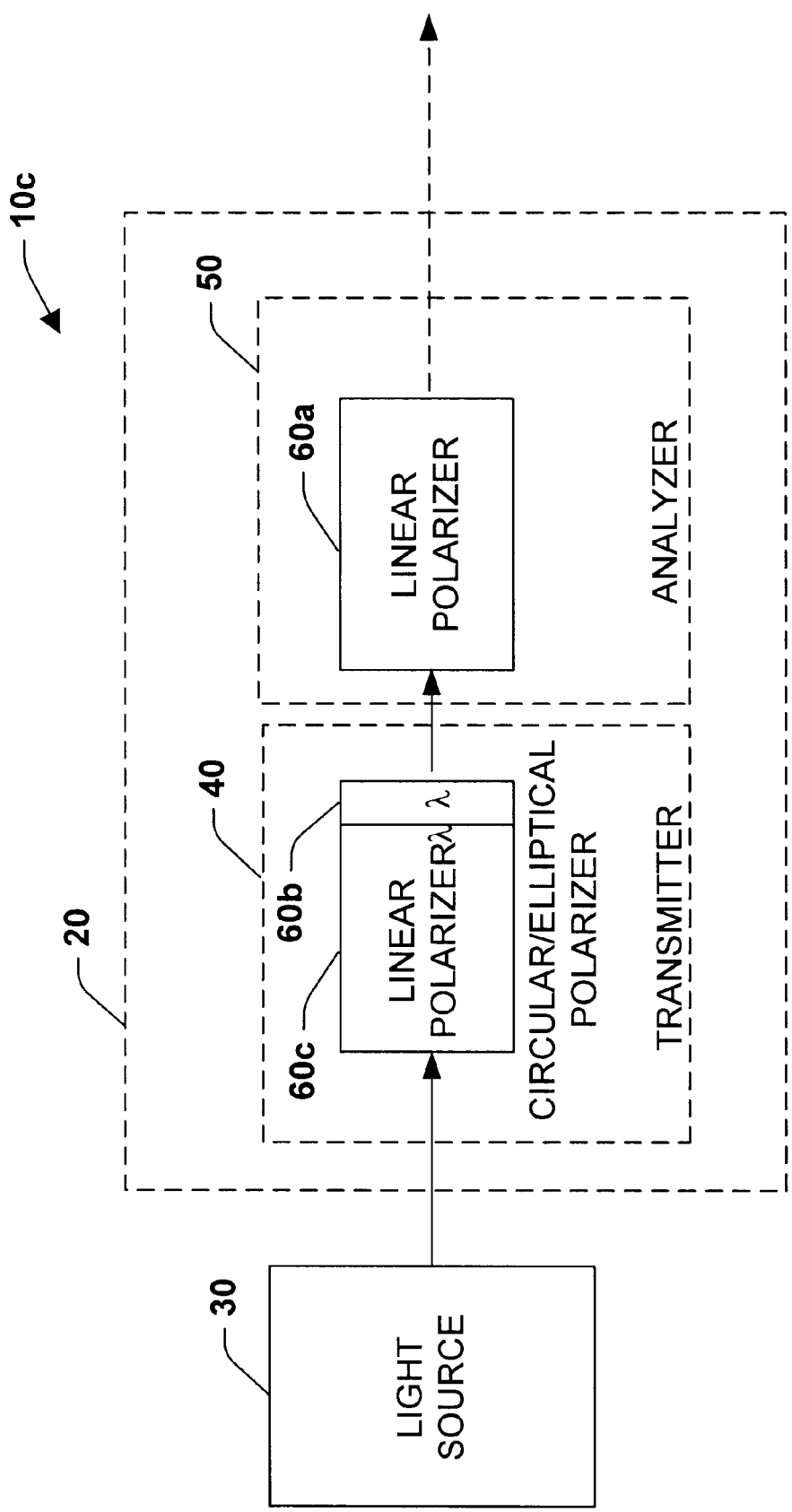
FIG. 3 is a schematic block diagram illustrating an unmatched polarization system in accordance with another aspect of the present invention.

Turning now to FIG. 3, a system 10c illustrates another aspect of the present invention. As described above, the present invention provides an unmatched polarization system to facilitate glare reduction. It is to be appreciated that the transmitter 40 may include a circular/elliptical polarizer (60b, 60c) and the analyzer 50 may include a linear polarizer 60a. In this manner, an unmatched polarization characteristic may also be achieved and glare reduction may be facilitated.

Figure 4:
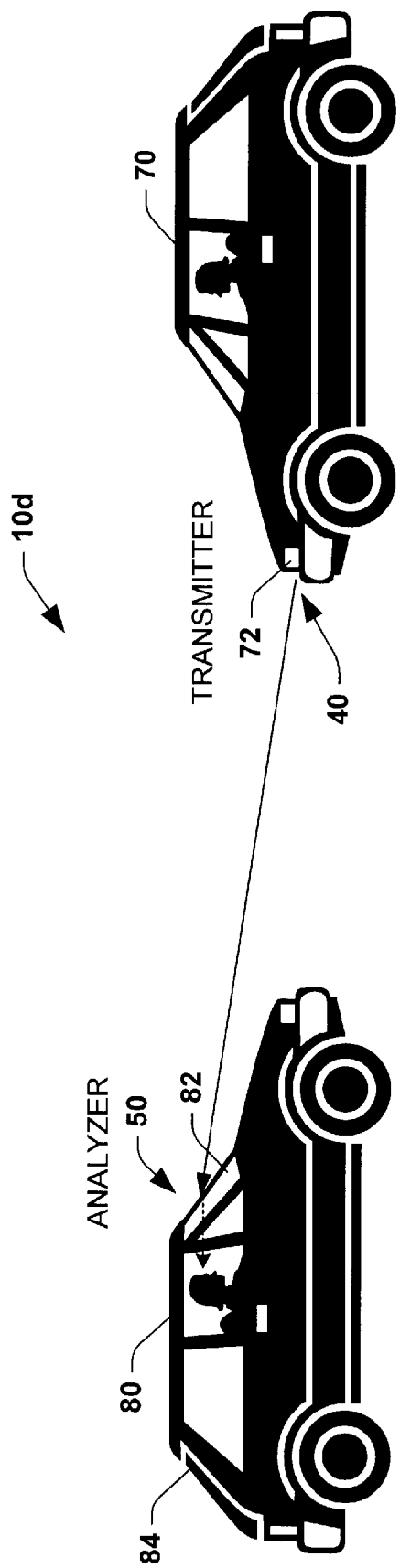
FIG. 4 is a schematic block diagram illustrating an automobile glare reduction system in accordance with an aspect of the present invention.

Referring now to FIG. 4, a system 10d illustrates a particular aspect of the present invention relating to reducing headlight glare from an automobile. A first automobile 70 may be adapted to have a transmitter 40, as described above, affixed to a headlight 72. It is to be appreciated that the transmitter 40 may be applied as a coating and/or thin material to provide polarization as described above. Alternatively, the transmitter 40 may be applied as a coating and/or thin material to the bulb (not shown) within the headlight 72. A second automobile 80 may be adapted with an analyzer 50 as described above to cooperate with the transmitter 40 to reduce glare in accordance with the present invention. For example, a windshield 82 of the second automobile 80 may have a portion and/or all of the windshield 82 coated and/or applied with a thin material to provide an unmatched polarization system as described above. It is to be appreciated that the analyzer 50 may be employed in a plurality of suitable areas in the automobile 80. For example, a rear windshield 84 may have an applied coating/material to reduce glare from automobiles behind (not shown) the automobile 80. Other suitable areas for employing the analyzer 50 may include a visor (not shown). It is further to be appreciated that the driver and/or passengers in the automobile 80 and/or pedestrians may wear goggles, glasses, and/or clip-on's which are adapted according to the present invention to reduce glare from the automobile 70.

Figure 5:
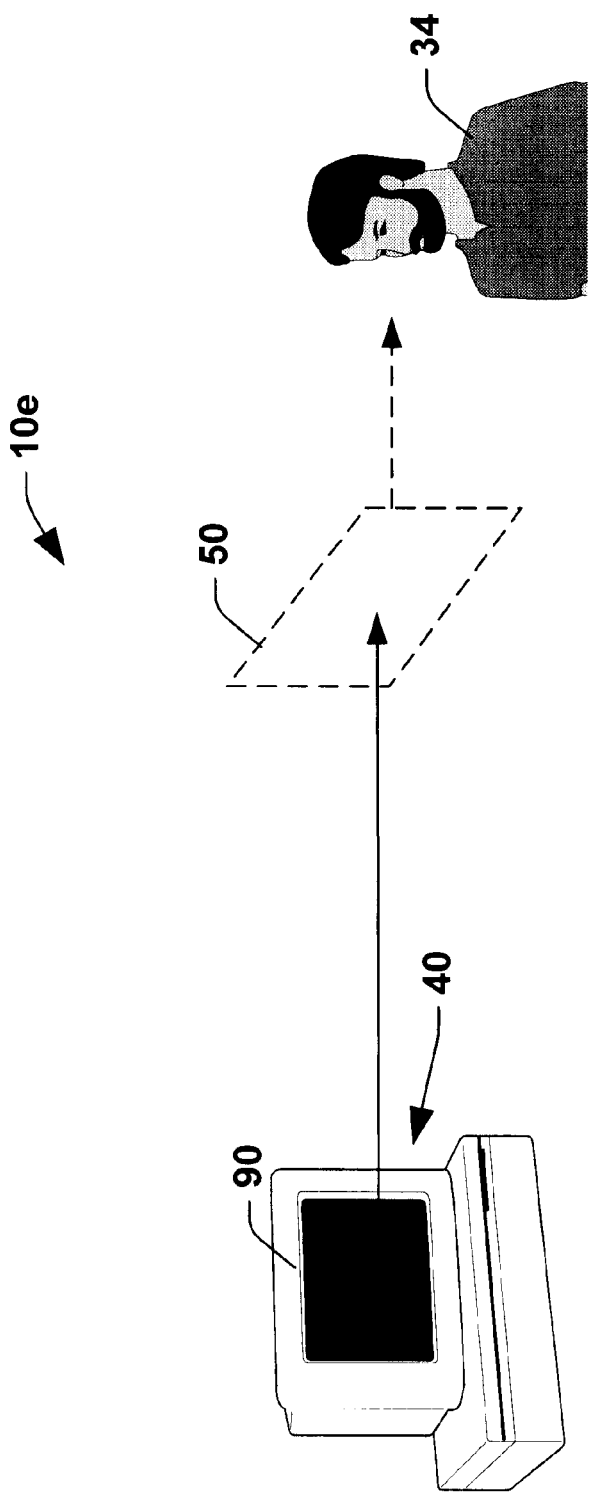
FIG. 5 is a schematic block diagram illustrating a screen glare reduction system in accordance with an aspect of the present invention.

Turning now to FIG. 5, a glare reduction system 10e illustrates a particular aspect of the present invention relating to reducing glare from a display screen 90. The display screen 90 may include televisions, computer monitors, DVD, VCR and movie screens, for example. According to the present invention, a transmitter 40 may be applied as a thin coating and/or material to the screen 90. An analyzer 50 which may be suitably placed in front of the observer 34 then provides glare reduction in accordance with the present invention. It is to be appreciated that the analyzer 50 may be a plurality of forms such as goggles, glasses, clip-on's and/or a thin screen placed in front of the observer 34.

Figure 6:
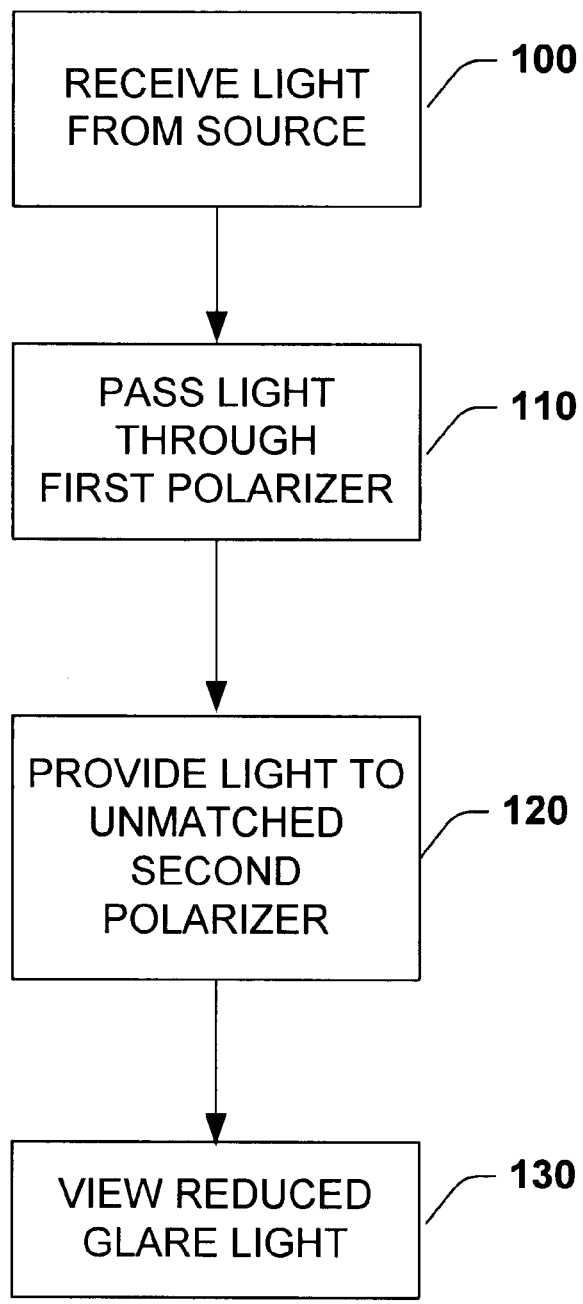
FIG. 6 is a flow chart diagram illustrating a methodology for glare reduction in accordance with one aspect of the present invention.

Referring now to FIG. 6, a methodology depicts a particular aspect of the present invention relating to reducing glare and improving visibility over conventional polarization systems. At step 100, light may be received from a source such as a headlight, stadium light, and/or display screen, for example. At step 110, the light is then provided to a first polarizer which may be a linear polarizer and/or circular/elliptical polarizer as described above. At step 120, the light from the first polarizer may be provided to an unmatched second polarizer. For example, if the first polarizer described above at step 110 were a circular/elliptic polarizer, then the light would be provided to a linear polarizer at step 120. Alternatively, if the light were provided to a linear polarizer at step 110 above, then the light would be provided to a circular/elliptical polarizer at step 120. At step 130, after the light has been filtered according to the unmatched polarization system of the present invention, an observer may view the light with reduced glare and with improved visibility over conventional systems.

Figure 7:
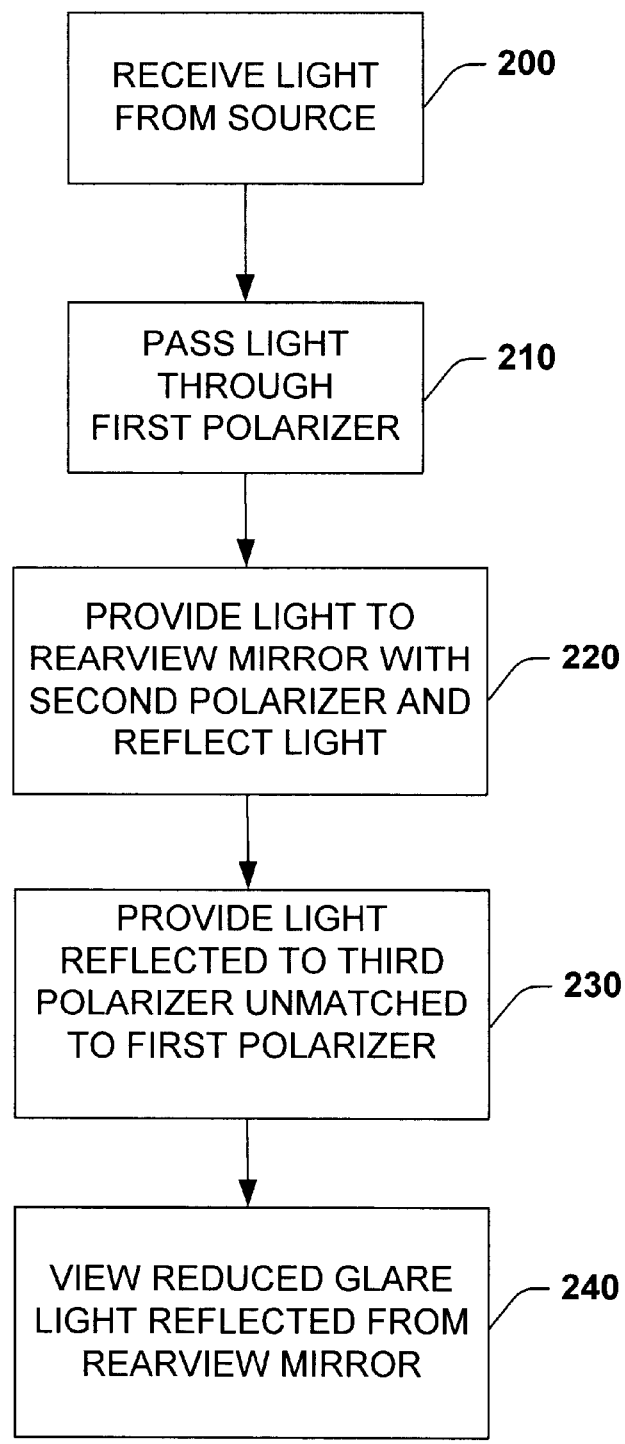
FIG. 7 is a flow chart diagram illustrating a methodology for glare reduction in accordance with another aspect of the present invention.

Referring now to FIG. 7, a methodology depicts a particular aspect of the present invention relating to reducing glare and improving visibility over conventional polarization systems regarding headlight glare reflected from a rearview mirror. At step 200, light may be received from a source such as a headlight, for example. At step 210, the light is then provided to a first polarizer which may be a linear polarizer and/or circular/elliptical polarizer as described above. At step 220, the light from the first polarizer may be provided to a rearview mirror with either a linear or circular/elliptical polarizer affixed thereto. At step 230, the light from the first polarizer, reflected by the rearview mirror with the second polarizer, may be provided to a third polarizer unmatched with the first polarizer. For example, if the first polarizer described above at step 210 were a circular/elliptic polarizer, then the light would be provided to a linear polarizer at step 230. Alternatively, if the light were provided to a linear polarizer at step 210 above, then the light would be provided to a circular/elliptical polarizer at step 230. At step 240, after the light has been filtered according to the unmatched polarization system of the present invention including the rearview mirror with polarizer, an observer may view the light with reduced glare and with improved visibility over conventional systems.

What has been described above are preferred aspects of the present invention. It is, of course, not possible to describe every conceivable combination of components and/or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claim.

What is claimed is:

1. A system for reducing glare, comprising:

a light source associated with a first polarizer transmitter disposed in proximity to the light source, the first polarizer transmitter filtering light from the source; and a second polarizer analyzer associated with a viewing device and positioned at a location remote from the first polarizer transmitter to view the light received from the first polarizer transmitter;

the first polarizer and the second polarizer are adapted to at least one of a first configuration and a second configuration to mitigate glare;

in accordance with the first configuration, the first polarizer is a linear polarizer and the second polarizer is at least one of a circular polarizer and an elliptical polarizer;

in accordance with the second configuration, the first polarizer is at least one of a circular polarizer and an elliptical polarizer, and the second polarizer is a linear polarizer.

2. The system of claim 1, wherein the first polarizer is associated with a headlight.

3. The system of claim 1, wherein the first polarizer is associated with at least one of a light and a bulb.

4. The system of claim 1, wherein the first polarizer is associated with at least one of a computer, television, and DVD screen.

5. The system of claim 1, wherein the second polarizer is associated with at least one of an automobile's visor, rearview mirror, front window, side window, and rear window.

6. The system of claim 1, wherein the second polarizer is associated with at least one of a window, goggles, glasses, and clip-ons.

7. The system of claim 1, wherein the at least one of the circular and elliptical polarizer further comprises a birefringent wave retarder.

8. The system of claim 7, the birefringent wave retarder being configured such that the wave retarder introduces a retardation of at least one of a quarter wavelength and a half wavelength.

9. The system of claim 7, wherein the at least one of the circular and elliptical polarizer further comprises a linear polarizer component, the birefringent wave retarder positioned between the linear polarizer and the linear polarizer component.

10. A method for reducing glare, comprising:

associating a first polarizer with a light source to transmit light from the source, the first polarizer disposed in proximity to the light source filtering light from the source;

positioning a second polarizer associated with a viewing device at a location remote from the first polarizer to view the light received from the first polarizer; and adapting the first polarizer and the second polarizer to at least one of a first configuration and a second configuration to mitigate glare;

in accordance with the first configuration, the first polarizer is a linear polarizer and the second polarizer is at least one of a circular polarizer and an elliptical polarizer;

in accordance with the second configuration, the first polarizer is at least one of a circular polarizer and an elliptical polarizer, and the second polarizer is a linear polarizer.

11. The method of claim 10, further comprising at least one of:

associating the first polarizer with at least one of a headlight, a bulb, a light, a computer, a television screen and a DVD screen; and associating the second polarizer with at least one of goggles, glasses, clip-on's, a window, an automobile's visor, a rear view mirror, a front windshield, a side window and a rear window.

12. The method of claim 10, further comprising configuring the at least one of the circular and elliptical polarizer with a birefringent wave retarder, the wave retarder being configured such that the wave retarder introduces a retardation of at least one of a quarter wavelength and a half wavelength.

13. A system for reducing glare from a rearview mirror, comprising:

a light source associated with a first polarizer transmitter disposed in proximity to the light source, the first polarizer transmitter filtering light from the source;

a second polarizer filter for a rearview mirror, and a third polarizer analyzer associated with a viewing device to view the light received from the first polarizer reflected back from the rearview mirror with the second polarizer, the third polarizer positioned at a location remote from at least one of the first polarizer and the second polarizer;

the first polarizer and the third polarizer are adapted to at least one of a first configuration configuration and a second configuration to mitigate glare;

in accordance with the first configuration, the first polarizer is a linear polarizer and the third polarizer is at least one of a circular polarizer and an elliptical polarizer;

in accordance with the second configuration, the first polarizer is at least one of a circular polarizer and an elliptical polarizer, and the third polarizer is a linear polarizer.

14. A method for reducing glare from a rearview mirror, comprising:

associating a first polarizer with a light source to transmit light from the source, the first polarizer disposed in proximity to the light source filtering light from the source;

providing a second polarizer affixed on or about the rearview mirror;

providing a third polarizer associated with a viewing device to view the light received from the first polarizer as reflected by the rearview mirror with the second polarizer so affixed, the third polarizer positioned at a location remote from at least one of the first polarizer and the second polarizer; and adapting the first polarizer and the third polarizer to at least one of a first configuration and a second configuration to mitigate glare;

in accordance with the first configuration, the first polarizer is a linear polarizer and the third polarizer is at least one of a circular polarizer and an elliptical polarizer;

in accordance with the second configuration, the first polarizer is at least one of a circular polarizer and an elliptical polarizer, and the third polarizer is a linear polarizer.

* * * * *